(12) United States Patent
Morgan et al.

(10) Patent No.: US 9,256,567 B2
(45) Date of Patent: Feb. 9, 2016

(54) STORAGE DEVICE WITH EXPANSION SLOT

(71) Applicant: SEAGATE TECHNOLOGY LLC, Cupertino, CA (US)

(72) Inventors: Michael Gene Morgan, Los Altos Hills, CA (US); Felix Markhovsky, Saratoga, CA (US); Cuong Tran, Milpitas, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/271,905

(22) Filed: May 7, 2014

(65) Prior Publication Data

US 2015/0324314 A1 Nov. 12, 2015

(51) Int. Cl.
- *H01L 23/32* (2006.01)
- *G06F 13/40* (2006.01)
- *G06F 13/42* (2006.01)
- *G06F 3/06* (2006.01)

(52) U.S. Cl.
CPC ............ *G06F 13/4068* (2013.01); *G06F 3/061* (2013.01); *G06F 3/067* (2013.01); *G06F 3/0644* (2013.01); *G06F 13/4221* (2013.01)

(58) Field of Classification Search
CPC ..... H01L 23/32; G06F 13/382; G06F 13/385; G06F 17/30002; G06F 13/4068; G06F 3/061; H01R 9/091; H01R 9/096
USPC .......... 257/685, 730; 361/731, 737, 760, 785; 365/63; 711/115
See application file for complete search history.

(56) References Cited

U.S. PATENT DOCUMENTS

| | | | |
|---|---|---|---|
| 8,363,394 B2 | 1/2013 | Chen et al. | |
| 2002/0083264 A1 | 6/2002 | Coulson | |
| 2010/0138580 A1* | 6/2010 | Asfur | 710/301 |
| 2010/0277825 A1 | 11/2010 | Chien | |
| 2011/0320690 A1* | 12/2011 | Petersen et al. | 711/103 |
| 2012/0047302 A1 | 2/2012 | Zhang et al. | |
| 2012/0304455 A1* | 12/2012 | Schuette | 29/604 |
| 2013/0046921 A1 | 2/2013 | Pyeon | |
| 2013/0054872 A1* | 2/2013 | Thomas et al. | 711/103 |
| 2015/0094875 A1* | 4/2015 | Duzly et al. | 700/300 |

OTHER PUBLICATIONS

Anonymous, "Hybrid HDD-mSATA SSD Controller Introduction"; URL:https://web.archive.org/web/20120511094419/http://addon-ics.com/datasheets/files/AD2SAHMSA2.pdf; May 11, 2012; pp. 1-2.
Anonymous, "Marvell HyperDuo for 6Gb/s SATA Controllers"; URL:https://web.archive.org/web/20110829000550/http://www.marvell.com/storage/system-solutions/assets/Marvell-HyperDuo-Product-Brief.pdf; Aug. 29, 2011; pp. 1-4.
European Search Report dated Aug. 4, 2015, for Corresponding European Patent Application No. 15166831.6.

* cited by examiner

*Primary Examiner* — Tu-tu Ho

(57) ABSTRACT

Provided is an apparatus including a first storage device. The apparatus also includes an expansion slot configured to receive a removable card with a second storage device. The removable card with the second storage device is configured to provide faster read/write times to the second storage device than read/write times of the first storage device. The first and second storage devices are seen as a single storage device by a host computing device.

20 Claims, 6 Drawing Sheets

STORAGE DEVICE WITH EXPANSION SLOT

BACKGROUND

External storage devices may be portable peripheral devices that provide storage capacity to augment the data storage internal to a host computing device, such as for backing up data in case of an internal hard drive failure or to provide additional storage capacity. Generally, external storage devices, have fixed capabilities, such as storage capacity. For instance, an external storage device may include a hard disk drive (HDD) placed inside a fixed enclosure. As a consequence, the external storage device may be replaced in order to obtain improved capabilities or functionality.

SUMMARY

Provided is an apparatus including a first storage device. The apparatus also includes an expansion slot configured to receive a removable card with a second storage device. The removable card with the second storage device is configured to provide faster read/write times to the second storage device than read/write times of the first storage device. The first and second storage devices are seen as a single storage device by a host computing device.

These and other features and aspects may be better understood with reference to the following drawings, description, and appended claims.

DRAWINGS

Figure 5A:
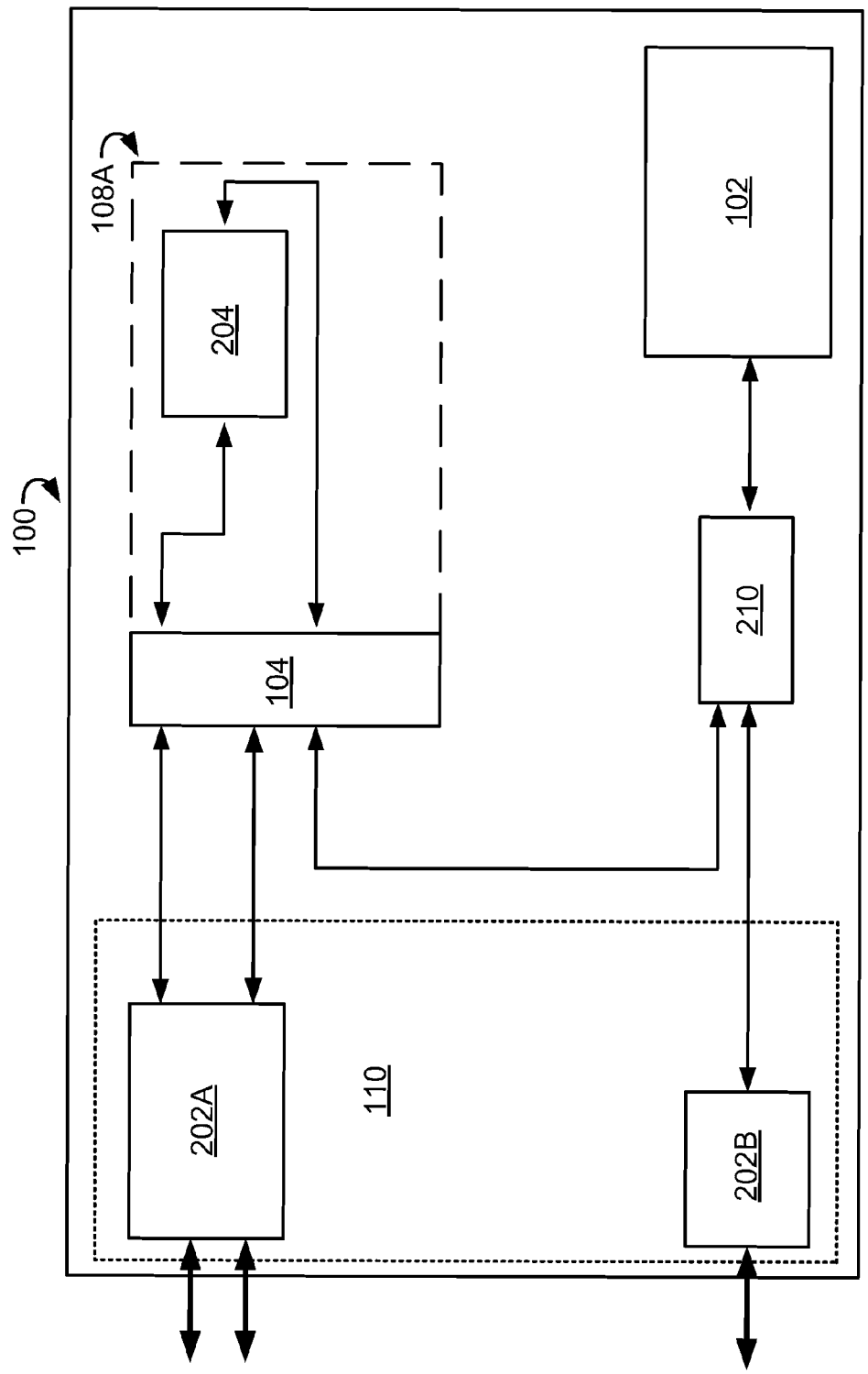
Figure 5B:
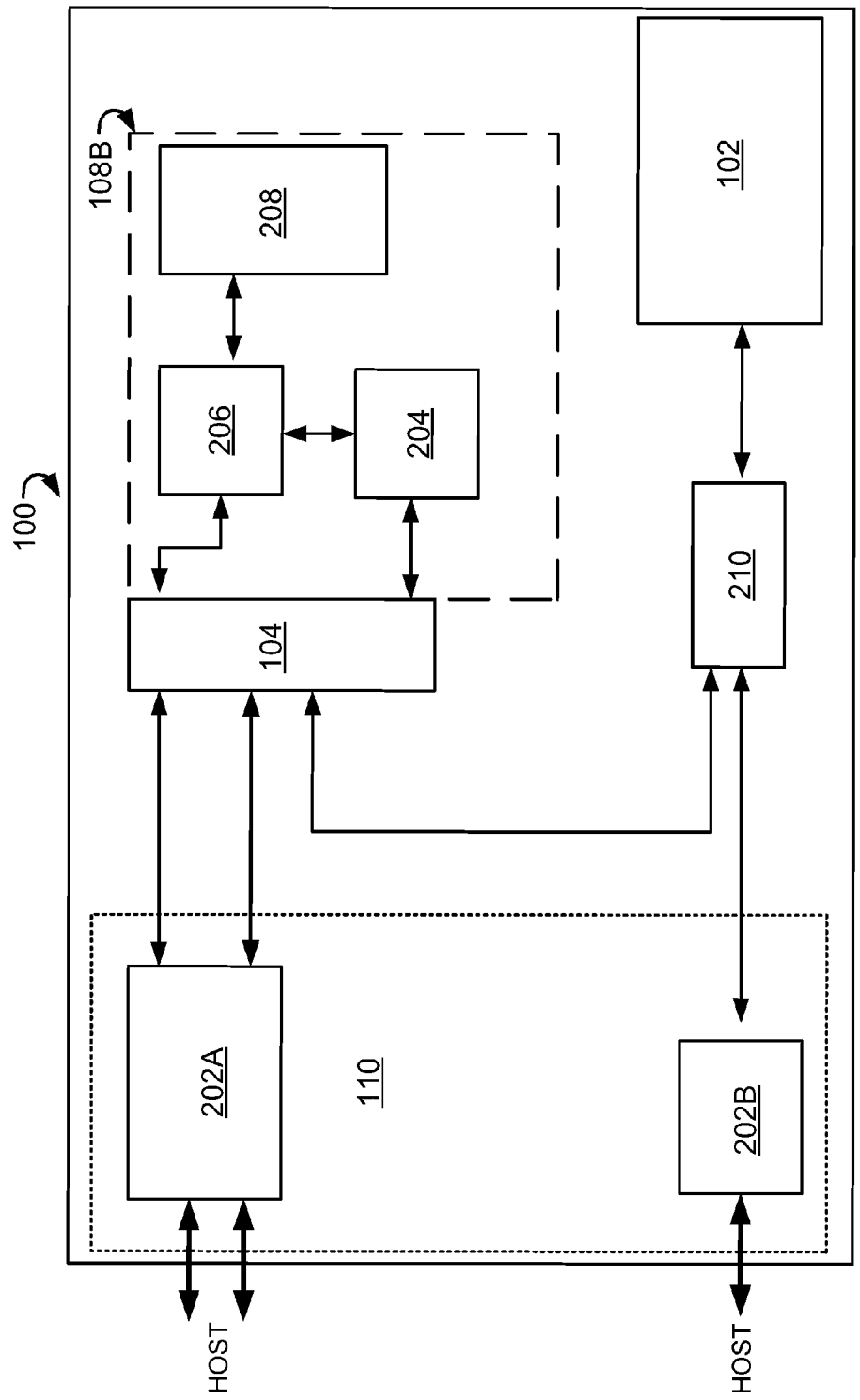

FIGS. 5A-B illustrate schematics of an example modular storage system, according to one aspect of the present description, according to one aspect of the present description.

DESCRIPTION

Before various embodiments are described in greater detail, it should be understood by persons having ordinary skill in the art that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood by persons having ordinary skill in the art that the terminology used herein is for the purpose of describing the certain concepts, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Unless defined otherwise, all technical and scientific terms used herein have the same meaning as commonly understood by persons of ordinary skill in the art to which the embodiments pertain.

Provided herein are embodiments to provide for adding functionality to expand the capabilities of external storage devices, such as for example an external hard disk drive (HDD). A modular storage system may be upgraded to provide capabilities for external storage devices to transfer data to a host computing device through one or more interfaces, such as for example, universal serial bus (USB) 3.0 or THUNDERBOLT 2. For example, the module storage system may include a HDD and an expansion slot configured to facilitate insertion or removal of an expansion module. The modular storage system may be expanded to transfer data with a host computing device at data rates compatible with the THUNDERBOLT 2 interface. In particular embodiments, the expansion module may include an additional storage device, such that both the HDD and the additional storage of the expansion module may be presented to an operating system (OS) as separate drives, thereby allowing a user to select whether to the transfer data to the HDD at relatively slow data rates or to the additional storage at relatively higher data rates.

Figure 1:
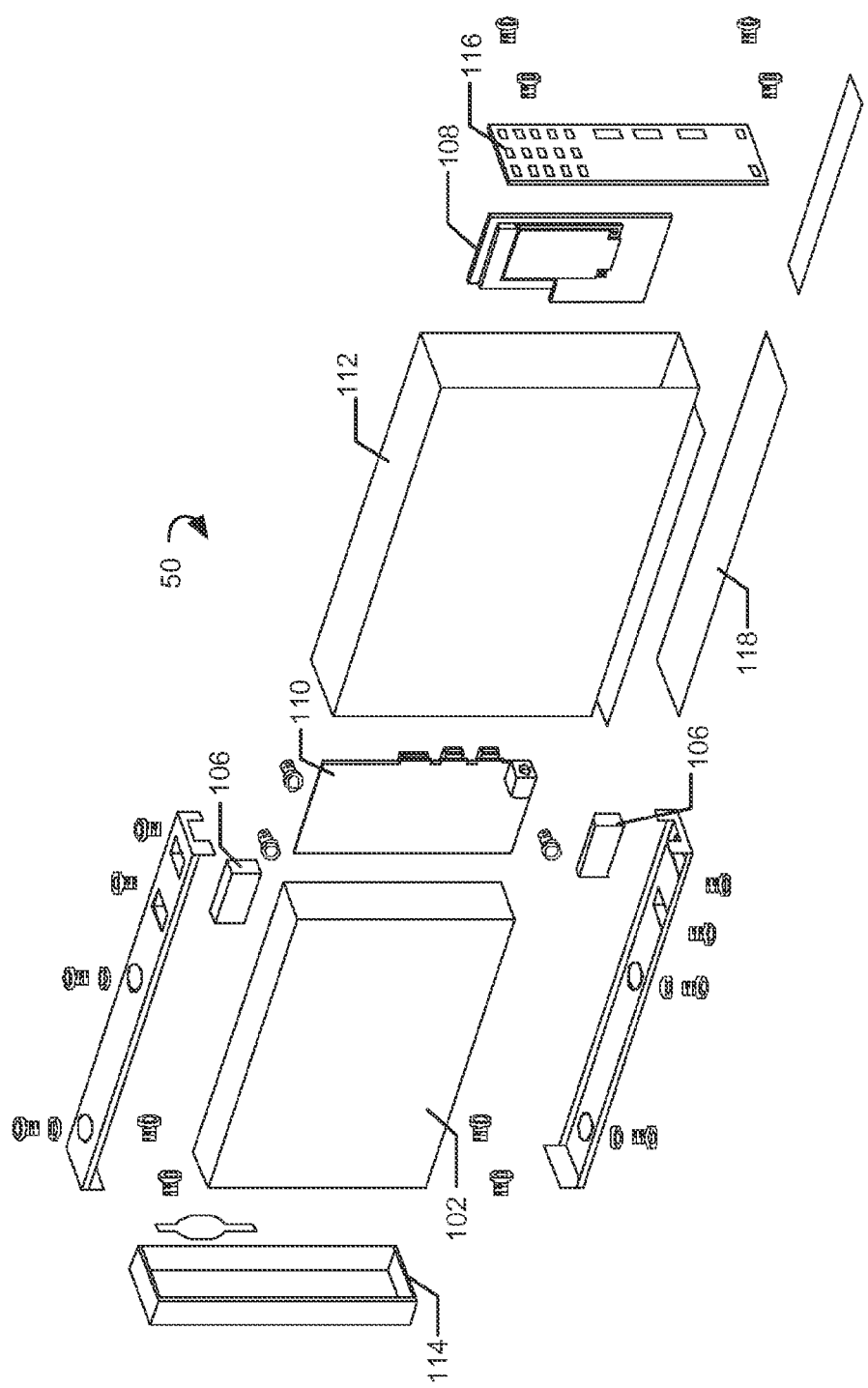
FIG. 1 illustrates an example external storage system, according to one aspect of the present description.

FIG. 1 illustrates an example modular storage system, according to one aspect of the present description. The external storage system may include a front panel 114, rear panel 116, and pedestal 118, as illustrated in the example of FIG. 1. Front panel 114 may include a switch (e.g. button) to power on external storage system 50. Rear panel 116 is configured to provide access to one or more ports of interface card 110 that each support a particular data bus interface. Rear panel 116 may be removable to facilitate insertion or removal of a module 108, also be referred to as an expansion module, as described below. In particular embodiments, a modular storage system, that includes a storage device 102, interface card 110, and one or more guide rails 106 attached to a chassis of modular storage system 100, may be enclosed in an enclosure 112 as part of an external storage system 50.

In particular embodiments, external storage system 50 may be coupled to a host computing device to provide additional storage or back-up storage of data for the host computing device. As described below, external storage system 50 may be coupled to the host computing device through a cable that couples to one of the ports on interface card 110. As an example, the host computing device may be coupled to external storage system 50 through a USB cable. In addition, external storage system 50 may be configured with pre-determined functionality provided through a default module 108 coupled to storage device 102. As described below, the default module may be removed and another module 108 with additional functionality, such as a high-speed module storage device, may be inserted in its place.

Figure 2:
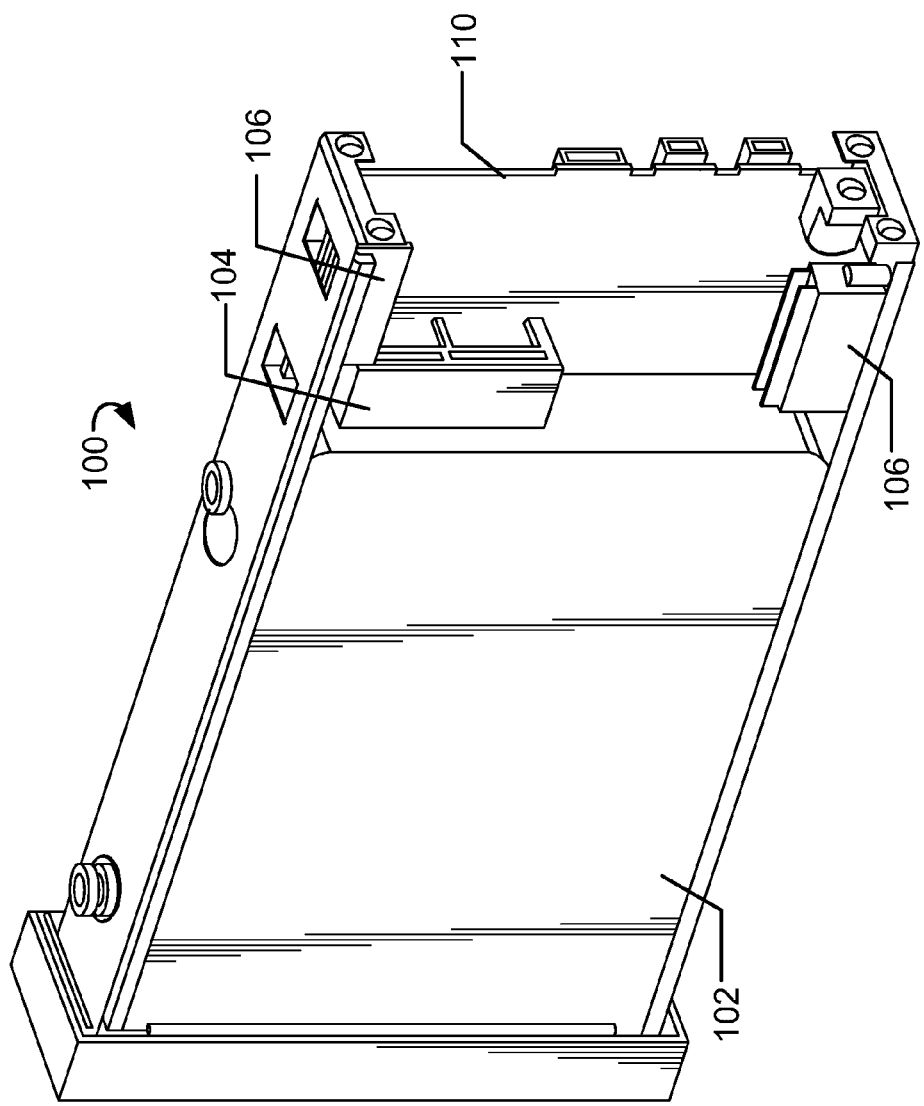
FIG. 2 illustrates an example assembled modular storage system without a module, according to one aspect of the present description.

FIG. 2 illustrates an example assembled modular storage system without a module, according to one aspect of the present description. As illustrated in the example of FIG. 2, modular storage system 100 may include, but is not limited to, a storage device 102, connector 104, interface card 110, and one or more guide rails 106 attached to a chassis of modular storage system 100. In particular embodiments, connector 104 may be a PCIe edge connector or slot. Guide rails 106 and connector 104 may form an expansion slot for removably coupling module 108 to storage device 102. For example, traces of the expansion module may mate with the corresponding portion of connector 104. Storage device 102 may be a HDD, solid-state drive (SSD), tape drive, optical drive, or any suitable data storage device. As an example, storage device 102 may be a 3.5" HDD. In particular embodiments, modular storage system 100 may be coupled to the host computing device (not shown) using a data bus interface (e.g. small computer system interface (SCSI), USB 2.0 or 3.0, IEEE 1394 ("FIREWIRE"), serial ATA (SATA), or THUNDERBOLT) through interface card 110.

Figure 3:
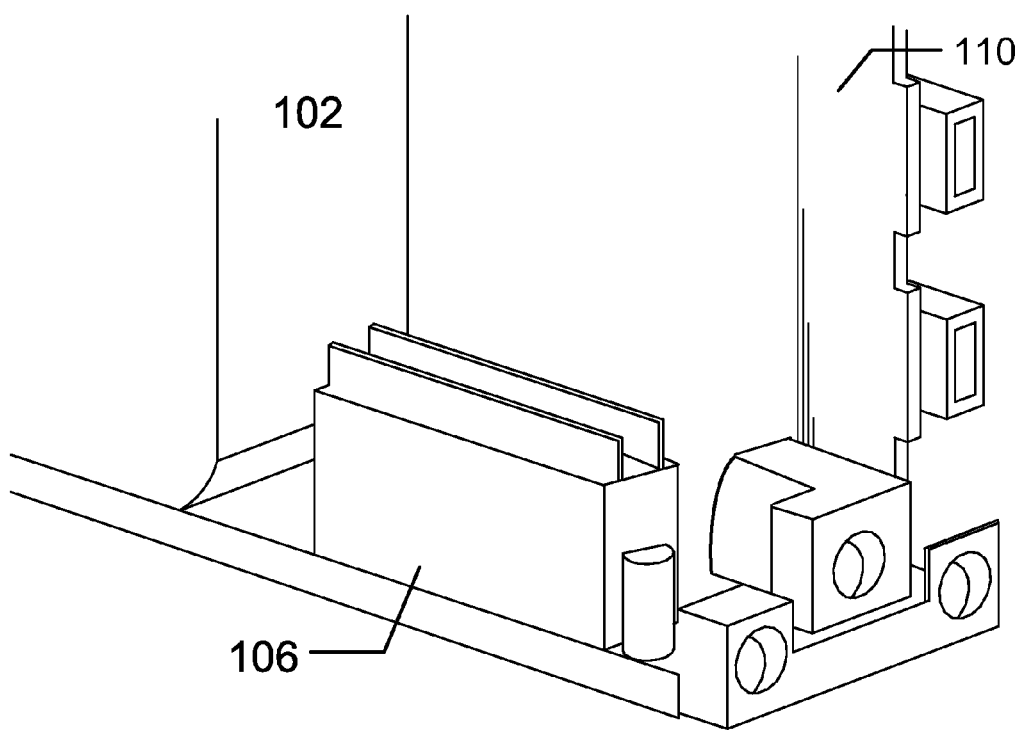
FIG. 3 illustrates a close-up view of an example assembled modular storage system without a module, according to one aspect of the present description.

FIG. 3 illustrates a close-up view of an example assembled modular storage system without a module, according to one aspect of the present description. As described above, modular storage system 100 may include a storage device 102, interface card 110, and one or more guide rails 106 attached to a chassis of modular storage system 100. Guide rails 106 serve to place a module at a pre-determined position in modular storage system. Guide rails 106 may position module 108 to electrically couple with storage device 102. As illustrated in the example of FIG. 3, a lower guide rail 106 may be configured as part of an expansion slot to hold a module in the pre-determined position. Although this disclosure describes and illustrates particular guide rails to position the module to the storage device, this disclosure contemplates positioning the module to the storage device through any suitable fixture.

Figure 4:
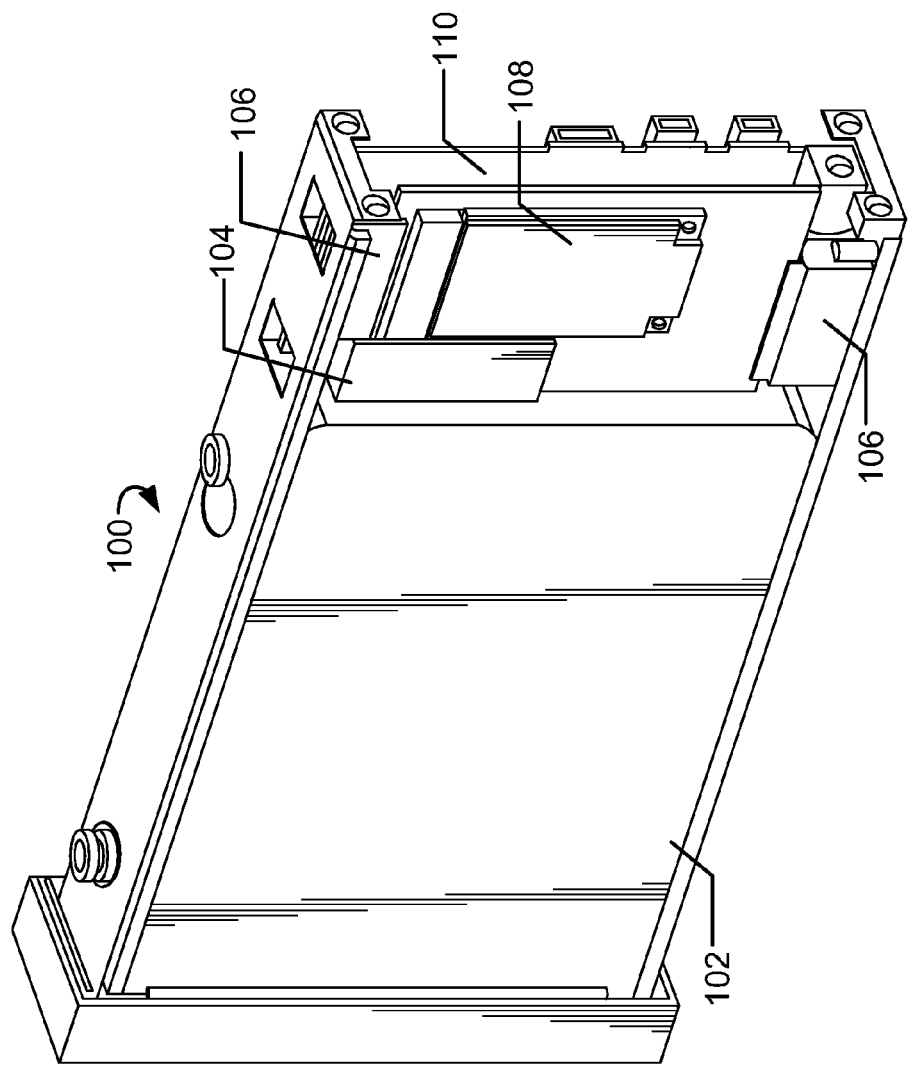
FIG. 4 illustrates an example assembled modular storage system with a module, according to one aspect of the present description.

FIG. 4 illustrates an example assembled modular storage system with a module, according to one aspect of the present description. As illustrated in the example of FIG. 4, module 108 is positioned, such that module 108 is electrically coupled to storage device 102 through connector 104 of interface card 110. As described above, ports of interface card 110 may support one or more data bus interfaces (e.g. small computer system interface (SCSI), USB 2.0 or 3.0, IEEE 1394 ("FIREWIRE"), serial ATA (SATA), or THUNDERBOLT. As described below, module 108 may be a printed-circuit board assembly (PCBA). Additional storage capacity can be provided to the host computing device by "daisy chaining" additional modular storage systems 100 or other external storage devices. Example host computing devices may include a desktop computer, laptop computer, tablet computer, set-top box, smart TV, digital media player, or any suitable computing device.

In particular embodiments, module 108 may provide one or more pre-determined capabilities or functionalities to augment storage device 102. For example, the data transfer rate between the host computing device and storage device 102 may be limited by the read and write speed of storage device 102. In particular embodiments, module 108 may include a high-speed storage device, such as for example a SSD, as described below. For example, a first module 108 may be uncoupled from storage device 102 and a second module 108 with a SSD may replace the first module 108 to provide data transfer between the host computing device and the SSD of the second module 108 that is higher than the data transfer rate between the host computing device and storage device 102.

FIGS. 5A-B illustrate example schematics of the modular storage system according to one aspect of the present description. As described above, modular storage system 100 may be coupled to the host computing device through one or more data bus interfaces, such as for example USB 3.0 or THUNDERBOLT 2. In particular embodiments, interface card 110 may be a PCBA configured to interface through one or more data connections to the host computing device using one or more data bus interfaces. In particular embodiments, interface card 110 may include one or more bridge circuits 202A-B configured to connect devices with differing data bus interfaces (e.g. PCIe to SATA). For example, bridge circuit 202A may be configured to convert data transmitted using a THUNDERBOLT 2 data bus interface to a PCIe data bus interface, whilst bridge circuit 202B may be configured to convert data transmitted using a USB 3.0 data bus interface to a SATA data bus interface. Although this disclosure describes and illustrates particular modules having a particular configuration of particular components, this disclosure contemplates any suitable module having any suitable configuration of any suitable components.

Data from the host computing device received at interface card 110 may be transmitted to module 108A-B. For example, data may be transferred between bridge circuit 202A and module 108A-B through connector 104 using a particular data bus interface, such as for example PCIe. As an example, bridge circuit 202A may be coupled to module 108A-B through a four lane (×4) PCIe data bus. As illustrated in the example of FIG. 2A, module 108A may include a bridge circuit 204 and one or more data buses coupling bridge circuit 204 to connector 104. Within module 108, the data buses may be configured to transmit data using a particular data bus interface, such as for example a four lane (×4) PCIe-Gen 2 data bus to bridge circuit 204 of module 108A. In particular embodiments, storage device 102 may be a HDD and bridge circuit 204 may be a PCIe to SATA bridge to interface with storage device 102 through a SATA data bus interface.

As described above, additional functionality may be implemented on external storage system 50 by inserting module 108B. In particular embodiments, the functionality of the modular storage system may be upgraded or enhanced by module 108B, such as for example higher storage, additional pre-determined functionality, or accelerated read/write access. As illustrated in the example of FIG. 2B, module 108B may include a bridge circuit 204 and one or more data buses coupling bridge circuit 204 to connector 104. Additionally, module 108B may include a switching circuit 206, module storage device 208, and data buses coupling switching circuit 206 to bridge circuit 204 and switching circuit 206 to module storage device 208. Within module 108B, the data buses may be configured to transmit data using a particular data bus interface, such as for example PCIe, from connector 104 to switching circuit 206 of module 108. As an example, switching circuit 206 may be coupled to connector 104 and module storage device 208 through four lane (×4) PCIe data buses. As another example, switching circuit 206 may be coupled to bridge circuit 204 through a one lane (×1) PCIe data bus. As described below, switching circuit 206 may be configured to write or read data from either module storage device 208 or storage device 102 of the expandable storage device. In particular embodiments, storage device 102 may be a HDD and bridge circuit 204 may be a PCIe to SATA bridge to interface with storage device 102 through a SATA data bus interface.

Data bus interfaces that support high data rate transfers (e.g. THUNDERBOLT 2.0) may provide opportunities for accelerating data transfers between the host computing device and modular storage system 100. In particular embodiments, module storage device 208 may have a higher read or write data rate than storage device 102. Module storage device 208 may be a SSD, such as for example a M.2 SSD. As an example, storage device 102 may be a 3.5" HDD with a read/write data rate in the range of approximately 200-400 MB/s (megabytes per second) and module storage device 208 may be a M.2 SDD with a read/write data rate in the range of approximately 1000-1300 MB/s. In particular embodiments, module 108B may be configured in a just a bunch of disks (JBOD) configuration, such that module storage device 208 functions as a storage device separate from storage device 102 of the modular storage system. As an example, in the JBOD configuration, a file from the host computing device may be selectively written to storage device 102 of modular storage system 100 or to module storage device 208 at a higher data rate relative to the data rate of storage device 102. In particular embodiments, the expansion module may include an additional storage device and the expansion module may be configured, such that both the HDD and the additional storage of the expansion module may be presented to an operating system (OS) as a single drive or storage device. Furthermore, the expansion module may be configured to operate independently of the OS or drivers of the host computing device In particular embodiments, module 108B may be configured as a cache controller, such that at least a portion of the data transferred between the host computing device and storage device 102 is stored at least temporarily by module storage device 208. As an example, a file from the host computing device may be first written to module storage device 208 for temporary storage at a higher data rate (e.g. 1200 MB/s) than storage device 102 is able to support. Data corresponding to the file may be written from module storage device 208 to storage device 102 concurrently with data being written to module storage device 208. In other words, module storage device may function as a read cache for storage device 102, thereby utilizing the differing data throughputs of module storage device 208 and storage device 102. Although this disclosure describes a particular configuration of particular components having particular data rates, this disclosure contemplates any suitable using any suitable configuration of components, where one component has a higher data rate than the other. Moreover, although this disclosure describes writing of data through caching operations using a particular configuration of particular components, this disclosure contemplates any suitable data access operations (e.g. reading or writing) through any suitable caching operations using any suitable configuration of any suitable components.

In particular embodiments, one or more functionality of modular storage system 100 may be modified to process data from the host computing device, such as for example, transcoding the data from one format to another. For example, video data may be transcoded from MPEG-4 data to QUICKTIME file format and the transcoded data stored on storage device 102 of modular storage system 100 without data processing being performed by the host computing device. In particular embodiments, module 108B may further include a processor (not shown) that is configured to operate in conjunction with a codec stored on module storage device 208. In another embodiment, module 108B may include a dedicated circuit to perform a particular function, such as for example, transcoding of data written to storage device 102. As an example, module 108B data corresponding to a multimedia file format such as APPLE QUICKTIME (.mov) format may be transcoded to MPEG-4 (.mp4) format whilst writing the multimedia file to storage device 102. The transcoded data may then be transmitted to storage device 102 for retrieval at a later time. As another example, multimedia data captured by a television tuner card of the host computing device may be transmitted to module 108B and transcoded to a particular data format, such as for example, WINDOWS MEDIA (.wmv). In other words, processing of data may be performed through module 108B instead of through the host computing system. Although this disclosure describes transcoding of data through data operations performed using a particular configuration of particular components, this disclosure contemplates any suitable data operation, such as for example digital filtering, compression, encoding, decoding, encryption, or error correction.

As illustrated in the example of FIGS. 5A-B, the host computing device may be coupled to a data bus interface, such as USB 3.0, through bridge circuit 202B. For example, bridge circuit 202B may be a USB 3.0 to SATA bridge to interface with storage device 102 through a SATA data bus interface. In particular embodiments, modular storage system 100 may also include a data-multiplexer (MUX) circuit 210. Data-MUX circuit 210 may be configured to selectively read/write data from the host computing device either through module 108A-B or bridge circuit 210 to storage device 102. As an example, when host computing device is writing data to storage device 102 through bridge circuit 202B, data-MUX circuit 210 may couple storage device 102 to bridge circuit 202B. In particular embodiments, modular storage system 100 may include an arbitration logic circuit (not shown) that is coupled to data-MUX circuit 210. The arbitration-logic circuit may be configured to determine whether the host computing device is accessing storage device 102 through either the data bus interface supported by bridge circuit 202A (e.g. THUNDERBOLT 2.0) or the data bus interface supported by bridge circuit 202B (e.g. USB 3.0). As an example, the arbitration-logic circuit may determine host computing device is reading data from storage device 102 through a USB 3.0 data bus interface supported by bridge circuit 202B and configure data-MUX circuit 210 to couple storage device 102 to bridge circuit 202B. As another example, the arbitration logic circuit may subsequently determine host computing device is writing data to storage device 102 through the THUNDERBOLT 2.0 data bus interface supported by bridge circuit 202A and configure data-MUX circuit 210 to couple storage device 102 to bridge circuit 202A.

In particular embodiments, a controller (not shown) of external storage system 50 may be configured to manage the operation of the module storage in a fashion that is transparent to the host computing device. In other words, the controller may manage whether data is stored on storage device 102, module storage device 208, or any combination thereof. In particular embodiments, the controller of external storage system may adaptively adjust the amount of data stored on storage device 102 or module storage device 208 based on the usage of external storage system 50. As an example, the controller may adjust the amount of data stored on storage device 102 or module storage device 208 based at least in part on determining an access frequency of one or more files stored on external storage system 50.

Provided herein is an apparatus that includes a first storage device. For example, in FIG. 1, the first storage device is illustrated as the HDD. An expansion slot is configured to receive a removable card with a second storage device. The removable card with the second storage device is configured to provide faster read/write times to the removable second storage device than read/write times of the first storage device. The first and second storage devices may be seen as a single storage device by a host computing device. For example, in FIGS. 1 and 4, the second storage device may be a module storage device (e.g. a SSD), that may have a higher read or write data rate than the HDD. In particular embodiments, apparatus may be configured, such that a portion of data of a first format is stored in the second storage device (e.g. a SSD) and transcoded into a second format for storage in the first storage device (e.g HDD).

Also provided herein is an apparatus that includes a storage device external to a computing device. For example, in FIG. 1, the first storage device is illustrated as the HDD. A PCBA that includes a memory is configured to store a portion of data received from the host computing device. For example, in FIG. 4, the PCBA is illustrated as a module with a SSD that is configured to read or write data at a speed higher than a read or write speed of the HDD respectively. The PCBA is coupled to the storage device through a connector configured to allow insertion or removal of the PCBA from the connector and provide for reading or writing of data between the memory and the storage device.

In particular embodiments, the PCBA is configured to operate in a just a bunch of disks (JBOD) configuration in conjunction with the storage device. In particular embodiments, the PCBA is configured to accelerate data access between the storage device and the computing device by storing at least a portion of the data in the SSD. For example, in FIG. 5B, the PCBA is illustrated as a module with a SSD. In particular embodiments, the PCBA further includes four lanes of peripheral component interconnect express (PCIe) for writing data from the computing device to the SSD. In particular embodiments, the PCBA is configured to transcode data from the computing device and store the transcoded data on the storage device. In particular embodiments, the PCBA includes a PCIe to serial ATA (SATA) bridge. For example, in FIGS. 5A-B, the PCIe to serial ATA (SATA) bridge is illustrated as a bridge circuit of the PCBA. In particular embodiments, the apparatus further includes one or more guide rails, as illustrated in FIGS. 2 and 3. In particular embodiments, the connector may be an edge connector.

Also provided herein is an apparatus that includes a storage device external to a computing device. A module is configured to receive or transmit data from the computing device and includes means for providing read or write access of data between the storage device and the computing device. For example, in FIG. 5A, the means are illustrated as a PCBA with a bridge circuit. As another example, in FIG. 5B, the means are illustrated as a PCBA with a bridge circuit, switching circuit, and a SSD. In particular embodiments, the means apply one or more pre-determined functions to at least a portion of data transmitted to the storage device by the computing device, as described in regard to the module illustrated in FIG. 5B. A connector is configured to allow insertion or removal of the module from the storage device.

While the embodiments have been described and/or illustrated by means of particular examples, and while these embodiments and/or examples have been described in considerable detail, it is not the intention of the Applicant to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. An apparatus comprising:
a storage device external to a computing device, wherein the storage device is a hard disk drive (HDD); and
a printed circuit board assembly (PCBA) comprising a memory configured to store at least a portion of data received from the computing device, the memory being configured to read or write data at a speed higher than a read or write speed of the storage device respectively, the PCBA being coupled to the storage device through a connector configured to allow insertion or removal of the PCBA from the connector and provide for reading or writing of data between the memory and the storage device.

2. The apparatus of claim 1, wherein the memory is a solid-state drive (SSD) and the PCBA is configured to operate in a just a bunch of disks (JBOD) configuration in conjunction with the storage device.

3. The apparatus of claim 1, wherein the memory is a SSD and the PCBA is configured to accelerate data access between the storage device and the computing device by storing at least a portion of the data in the SSD.

4. The apparatus of claim 1, wherein the PCBA further comprises four lanes of peripheral component interconnect express (PCIe) for writing data from the computing device to the SSD.

5. The apparatus of claim 1, wherein the PCBA is configured to transcode data from the computing device and store the transcoded data on the storage device.

6. The apparatus of claim 1, wherein the PCBA comprises a PCIe to serial ATA (SATA) bridge.

7. The apparatus of claim 1, further comprising one or more guide rails.

8. The apparatus of claim 1, wherein the connector comprises an edge connector.

9. An apparatus comprising:
a storage device external to a computing device;
a module configured to receive or transmit data from the computing device and comprising:
means for providing read or write access of data between the storage device and the computing device, the means applying one or more pre-determined functions to at least a portion of data transmitted to the storage device by the computing device;
a connector configured to allow insertion or removal of the module from the storage device.

10. The apparatus of claim 9, wherein the module comprises a printed circuit board assembly (PCBA) comprising a solid-state drive (SSD) configured to store at least a portion of data received from the computing device, the memory being configured to read or write data at a speed higher than the storage device.

11. The apparatus of claim 10, wherein one or more of the pre-determined functions comprises writing data from the computing device to the SSD configured to operate in a just a bunch of disks (JBOD) configuration in conjunction with the storage device.

12. The apparatus of claim 10, wherein one or more of the pre-determined functions comprises configuring the SSD to accelerate data access between the storage device and the computing device by storing at least a portion of the data in the SSD.

13. The apparatus of claim 10, wherein the PCBA further comprises four lanes of peripheral component interconnect express (PCIe) for writing data from the computing device to the SSD.

14. The apparatus of claim 10, wherein the means for providing read or write access of data between the storage device and the computing device comprises a PCIe to SATA bridge and a PCIe switch, wherein the PCIe switch is configured to send data to the SSD or the storage device.

15. The apparatus of claim 9, wherein the means for providing read or write access of data between the storage device and the computing device comprises a PCIe to serial ATA (SATA) bridge configured to send data between the computing device and the storage device.

16. The apparatus of claim 9, wherein the module is further configured to transcode data from the computing device and store the transcoded data on the storage device.

17. An apparatus comprising:
a storage device external to a computing device; and
a printed circuit board assembly (PCBA) comprising a memory configured to store at least a portion of data received from the computing device, the memory being configured to read or write data at a speed higher than a read or write speed of the storage device respectively, the PCBA being coupled to the storage device through a connector configured to allow insertion or removal of the PCBA from the connector and provide for reading or writing of data between the memory and the storage device, wherein the PCBA comprises a PCIe to serial ATA (SATA) bridge.

18. The apparatus of claim 17, wherein the memory is a solid-state drive (SSD) and the PCBA is configured to operate in a just a bunch of disks (JBOD) configuration in conjunction with the storage device.

19. The apparatus of claim 17, wherein the memory is a SSD and the PCBA is configured to accelerate data access between the storage device and the computing device by storing at least a portion of the data in the SSD.

20. The apparatus of claim 17, wherein the PCBA is configured to transcode data from the computing device and store the transcoded data on the storage device.

* * * * *